R. A. WILLSON.
ELECTRIC HEATER FOR HOT WATER TANKS.
APPLICATION FILED FEB. 15, 1917.
1,244,817.
Patented Oct. 30, 1917.
2 SHEETS—SHEET 1.
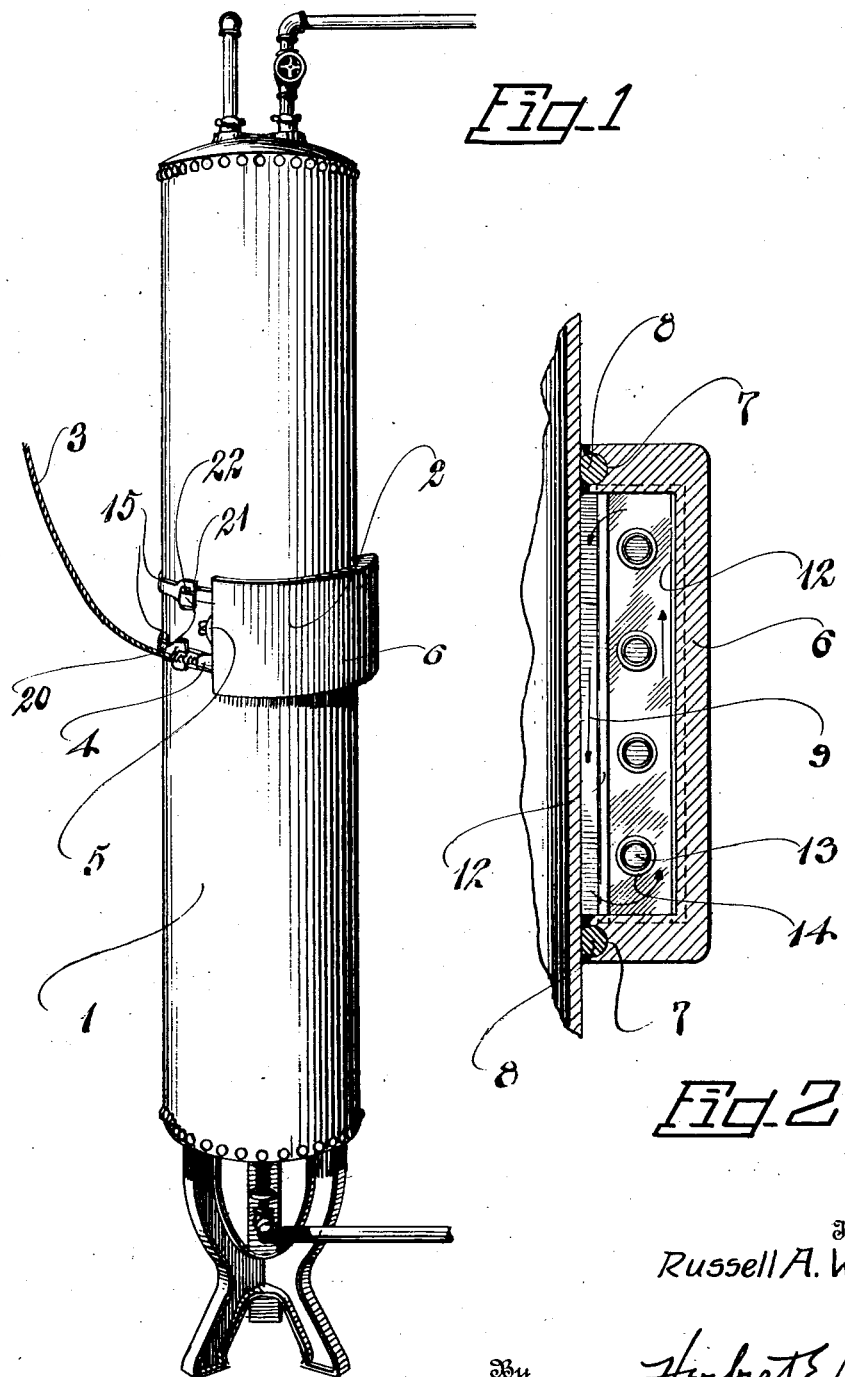
Inventor
Russell A. Willson
By Herbert E. Smith
Attorney R. A. WILLSON.
ELECTRIC HEATER FOR HOT WATER TANKS.
APPLICATION FILED FEB. 15, 1917.
1,244,817.
Patented Oct. 30, 1917.
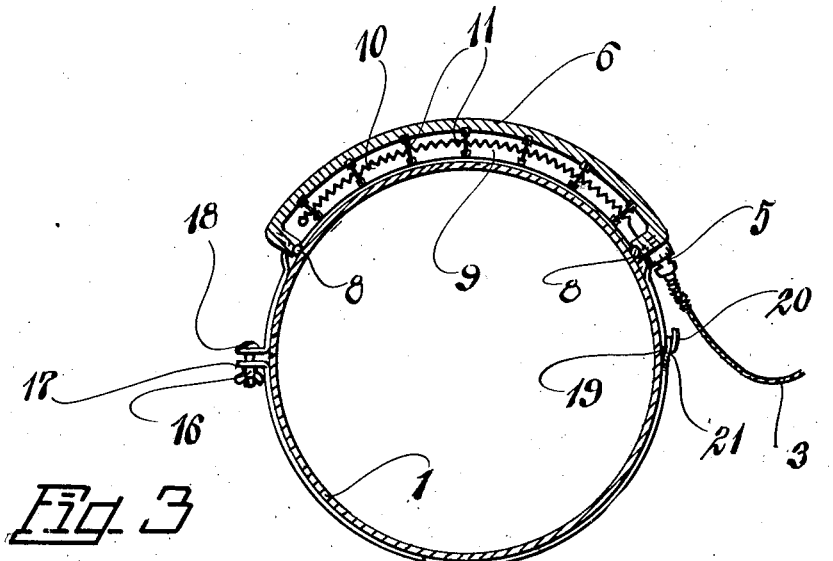
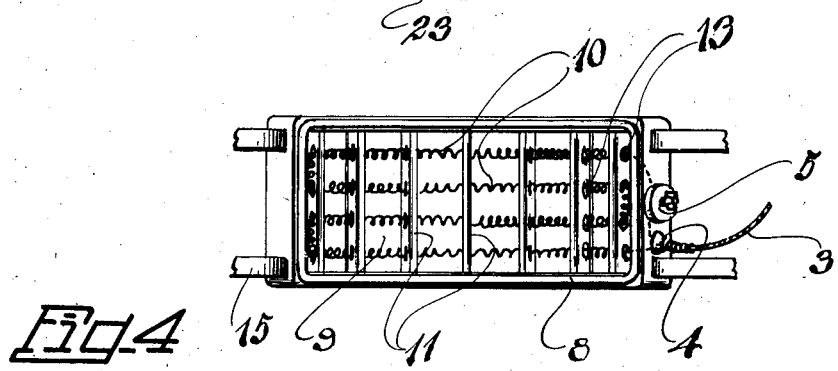
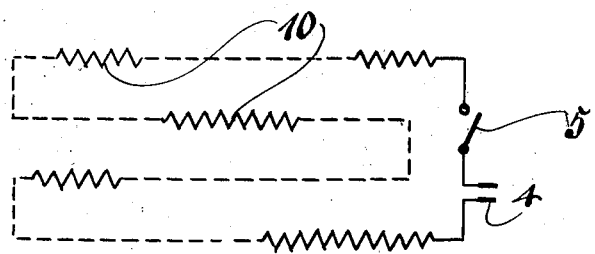
Inventor
Russell A. Willson

UNITED STATES PATENT OFFICE.

RUSSELL A. WILLSON, OF SPOKANE, WASHINGTON.

ELECTRIC HEATER FOR HOT-WATER TANKS.

1,244,817. Specification of Letters Patent. Patented Oct. 30, 1917.

Application filed February 15, 1917. Serial No. 148,816.

*To all whom it may concern:*

Be it known that I, RUSSELL A. WILLSON, a citizen of the United States, residing at Spokane, in the county of Spokane and State of Washington, have invented certain new and useful Improvements in Electric Heaters for Hot-Water Tanks, of which the following is a specification.

This invention relates to an electric heater and is especially adapted for heating hot water tanks and it comprises a resistance supported in a casing to be attached to a tank and providing direct heat radiation to the tank wall thereof and a means for supporting the structure of my invention in a suitable manner such that it may be readily adjusted vertically thereof.

One of the objects of the present invention is the production of an electric heater which has a higher efficiency than the usual type and which is adapted for local application to a hot water tank and is adjustable along the longitudinal dimensions thereof to provide more or less hot water as desired, thereby effecting a saving of electricity when only a portion of the tank is desired to be heated and to secure quick results when only a small amount of water is desired.

A further object of my invention is to provide a heater consisting of a casing composed of a non-heat conducting material supporting wire resisters expansively supported within the casing with an open face adjacent the tank walls and provided with means for closely engaging the tank to tightly seal the heating elements from contact with outside air.

It is a further object to provide a heater which will be efficient, but which will provide a wide gap between the heating elements and the tank wall and at the same time provide direct radiation from such elements with the metal walls of the tank.

All of the foregoing features are of the utmost importance and more or less essential in my construction.

In the following specification I will describe in detail the specific embodiment of my improvements, recourse being had to the accompanying drawings in which, Figure 1 is an elevation of a tank showing my electric heater applied thereto at a point somewhat near the center of the tank.

Fig. 2 is a vertical cross section taken through the heater.

Fig. 3 is a horizontal cross section therethrough.

Fig. 4 is an elevation of my heater looking on the face that is applied to the tank.

Fig. 5 is a diagrammatical view of the heating element showing plug attachment and controlling switch.

Referring more specifically to the drawings in which like reference characters indicate like parts in the several views, the numeral 1 designates a hot water tank of the usual construction, 2 my electric heater, 3 electric wires running from the source of supply and connecting by means of a detachable plug 4 to the heater. A switch 5 is provided to cut on or off the current. The heater body consists of a casing 6 of curvilinear form having the same general radii on its inner face as the tank to which it is applied. It is my purpose to construct this casing of a composition of asbestos or kindred material which is a non-conductor of heat and to mix with the asbestos a binder such as cement which when molded in the form herein shown, will be substantial and not subject to easy breakage.

If necessary I contemplate placing a metal or fabric casing over the molded form as above described but do not deem this actually necessary to the efficiency of the construction which I am about to outline.

Upon the edges of the casing 6 that bear against the tank walls I provide a recess 7 for receiving a gasket 8 which may be constructed of rope asbestos or of some other suitable compressible substance that will provide an air-tight joint with the tank to prevent air entering the space 9 within the casing. Within this space I support heating elements 10 which may consist of the usual resistance wire element usual for heating and support these wires at intervals by means of bridges 11 which are constructed of water glass, mica or some similar non-conductive material. To add strength to the bridges I provide metal ferrules 12. These ferrules extend over the entire length of the bridges and are embedded or positioned in slots in the back end and walls of the casing 6 to be substantially retained there. Centrally of the bridges at intervals are holes 13 reinforced with eyelets 14 through which the coiled heating elements 10 pass. The eyelets being somewhat larger than the coil of the element allow of expansion of the coil which, at 800 degrees Fahrenheit, will be as much as twenty five per cent., depending upon the type of wire.

To support the electric heater of my construction upon a hot water tank I provide straps 15 engaging the ends of the heater and passing around the tank. To insure a positive connection with the tank I provide on the straps a thumb screw 16 engaging the ends 17 and 18 to draw them closely together and bind somewhat upon the body of the tank. In order to effect an easy removal of my heater I break the straps at 19 and turn back the end 20 to form a hook. At 21 I enlarge the end somewhat and provide a transverse slot 22 to engage over the hook 20 so that when it is desired to remove the heater, by removing the thumb screw 16 I can hinge the member 23 on the hook 20 so that easy removal is effected. As a rule the heater will be left attached to the tank, but as it is an object of my invention to provide for localized heating in most cases it will only necessitate the loosening of the thumb screw 16 so that the heater may be moved to the desired position and the thumb screw again tightened to effect the change.

Many times in heating water it is not desired that a large quantity of water be heated and it is desirable, on account of the expense of operating electric heaters, to be as economical in the amount of electricity required as possible. Thus I have provided my heater so that if only a small quantity of water is necessary for the purpose in hand it may be adjusted close to the top of the boiler and when the heat is applied it will act upon only that portion of water opposite the heater and above to the top. When it is desired to heat a greater quantity of water the heater may be lowered to the desired point to give the required amount and be held fixed at that point until a different setting is made necessary. By this means I am enabled to quickly heat a given amount of water without result in loss of electricity or waste thereof.

It is an important feature of my invention to make the interior of the heater airtight and for this reason I have taken especial pains to provide sealing means to render it so. The heating elements which consist of metallic wires are subject to oxidization when exposed to air and their life is short, requiring constant replacement and to avoid this and to render the life of my heating elements longer than the usual, I have provided the herein described construction which operates to first burn out the oxygen that has been inclosed in the shell of the heater and after that time run my heater elements in the nitrogen gas that is left after the oxygen has been burned out which increases the efficiency and prevents further oxidization and destructive forces upon the heating elements.

Hitherto it has been necessary to entirely inclose the heating elements in an insulation and embed them in a metal plate to prevent rapid deterioration of the resistance elements. It has also been a feature of constructions of the present day heaters, to expose the wires direct to air which rapidly destroys the life and causes frequent repair expense. By reason of the construction that I have devised I am enabled to overcome rapid deterioration and at the same time provide direct heat radiation against the wall of the tank to localize my heat at a desired point and at the same time to effect rapid heat application by reason of the circulation of the inclosed air within the body of the casing, the heat rising to the top causing the chilled air formed by the water in the tank to travel to the bottom in the direction of the arrows, as shown in Fig. 2, and again rise heated by passing through and around the heating elements.

It also has been necessary to secure efficiency out of the power consumed to dispose the heating elements close to the surface upon which it is intended to act, as for instance, the bottom of a kettle, plate or other means being heated. In hot water tank heating where electric heaters have been applied we have a new condition, by reason of the water connections and pipes that are grounded but which still requires close application of the heating elements to some of the metal parts which causes a narrow gap between the grounded part and the heater, which, in the case of electrical storms and in the presence of static electricity, causes a spark to jump across to destroy the heating elements, blow the fuses of the service and otherwise cause annoyance and destruction. In my construction I have spaced my heating elements at a distance from the tank structure sufficient to eliminate the possibility of electricity and lightning bridging the gap and have done this without destroying the efficiency of the heater.

It will thus be seen that I have provided a construction which will allow the use of my heater over a wide range of space upon a hot water tank to effect a saving and to heat only such a portion of water as will be required and it is obvious that various changes in the form and proportion and in the minor details of construction may be resorted to without departing from the spirit or sacrificing any of the principles of the invention.

I claim:—

1. An electric heater comprising a hollow casing supporting a heating element therein in spaced relation and adapted for attachment to a hot water tank and vertically adjustable thereon, said casing being open on the side adjacent the tank and having air-tight connection therewith.

2. An electric heater comprising a hollow casing supporting a heating element and adapted for local application to a hot water tank and being adjustable thereon, said casing being provided with an open side, and means adjacent thereto for sealing said casing to a hot water tank supporting the heating elements in spaced relation therewith and providing direct contact of the heater with the tank wall.

3. An electric hot water tank heater comprising a hollow casing of a non-conductive material having one side open, means for supporting the open side of the casing against said tank and providing air-tight connection therewith to exclude air from the hollow portion of the casing, heating elements supported within said hollow and non-conductive bridges supporting said elements.

4. An electric hot water tank heater comprising a hollow casing of a non-conductive material having one side open, means for supporting the casing against a hot water tank in such a manner that the open side will be adjacent the tank wall and will be hermetically sealed thereon and said supporting means providing for local adjustment on the tank, heating elements in spaced relation with each other and supported by non-conductive bridges attached to the side walls of said casing and in spaced relation with respect to the tank wall, the interior walls of said casing forming reflecting surfaces for the heat generated and provided to induce circulation therein.

5. An electric heater comprising a casing supporting heater elements and of curvilinear construction with an open face adjacent the point of attachment to the hot water tank, means for adjustably securing said casing to the tank and hermetically sealing same thereto so that the heating elements may be operated within the inclosure free from the presence of fresh air.

6. An electric heater comprising a hollow casing supporting metallic heater elements therein, said casing being provided with means permitting adjustable attachment to a hot water tank and adapted to expose the heat generated by the heating elements in direct contact with the tank, and means whereby circulation is provided and the chilled air may be passed down, across the bottom of the casing, up the back wall and through the heating elements.

In testimony whereof I affix my signature.

RUSSELL A. WILLSON.